United States Patent [19]
Ozawa et al.

[11] Patent Number: 5,778,504
[45] Date of Patent: Jul. 14, 1998

[54] AUTOMATIC LATHE HAVING INDEPENDENTLY MOVABLE GANG TOOL POSTS

[75] Inventors: Satoru Ozawa; Shozo Kasuya, both of Shizuoka, Japan

[73] Assignee: Star Micronics Co., Ltd., Shizuoka, Japan

[21] Appl. No.: 676,091

[22] Filed: Jul. 2, 1996

Related U.S. Application Data

[63] Continuation of Ser. No. 201,390, Feb. 24, 1994, Pat. No. 5,564,171.

[30] Foreign Application Priority Data

Feb. 27, 1993 [JP] Japan .................................. 5-062822
Jul. 29, 1993 [JP] Japan .................................. 5-208324

[51] Int. Cl.$^6$ .................................................. B23B 7/00
[52] U.S. Cl. .................... 29/27 C; 29/27 R; 29/53; 29/55; 82/123; 82/129; 82/138; 408/24
[58] Field of Search ................. 29/26 A, 27 C, 29/27 R, 40, 50, 51, 53, 55, 129; 82/118, 123, 138, 129, 159, 120, 124, 121; 408/24, 25

[56] References Cited

U.S. PATENT DOCUMENTS

| Re. 31,627 | 7/1984 | Evans | 74/89.15 |
|---|---|---|---|
| 2,348,052 | 5/1944 | Boillat | 82/159 |
| 3,448,643 | 6/1969 | Kylin . | |
| 4,090,281 | 5/1978 | Hautau | 29/40 |
| 4,457,193 | 7/1984 | Matthey | 82/159 |
| 4,597,144 | 7/1986 | Frank et al. | 299/40 |
| 4,612,832 | 9/1986 | Ushigoe et al. | 82/129 |
| 4,683,787 | 8/1987 | Link | 82/159 |
| 4,704,773 | 11/1987 | Quinart . | |
| 4,730,373 | 3/1988 | Senoh | 82/129 |
| 4,741,221 | 5/1988 | Hudimac, Jr. | 74/424.8 |
| 4,776,247 | 10/1988 | Kiya . | |
| 4,785,525 | 11/1988 | Ishida et al. | 29/27 R |
| 4,842,457 | 6/1989 | Badagnani | 400/183 |
| 4,949,443 | 8/1990 | Saruwatari et al. | 29/27 C |
| 5,152,201 | 10/1992 | Izawa | 82/129 |
| 5,490,307 | 2/1996 | Link | 29/27 C |

FOREIGN PATENT DOCUMENTS

| 64-766 | 11/1982 | European Pat. Off. | 82/129 |
|---|---|---|---|
| 54-132888 | 10/1979 | Japan | 82/159 |
| 62-264807 | 11/1987 | Japan . | |
| 6-702 | 1/1994 | Japan | 82/129 |
| 6-114602 | 4/1994 | Japan | 82/129 |

*Primary Examiner*—A. L. Pitts
*Assistant Examiner*—Christopher Kirkman
*Attorney, Agent, or Firm*—Whitham, Curtis & Whitham

[57] ABSTRACT

An automatic lathe includes a pair of gang tool posts disposed on opposite sides of a headstock. The headstock has a main spindle and is movable axially of the main spindle, and the pair of gang tool posts are independently movable in respective two directions perpendicular to each other and perpendicular to the axial direction. Pitches between work tools on one of the gang tool posts differ from pitches between work tools on the other gang tool post such that when a free-end position of an arbitrary work tool of a first gang tool post is aligned with that of an arbitrary work tool of a second gang tool post, free-end positions of the other work tools of the first gang tool post mutually differ from those of the other work tools of the second gang tool post. To ensure simultaneous machining of the front face of one workpiece and the back face of another workpiece respectively using front and rear work tools, the front work tools are mounted on a rear headstock and the rear work tools are mounted on one of the pair of gang tool posts.

17 Claims, 17 Drawing Sheets

AUTOMATIC LATHE HAVING INDEPENDENTLY MOVABLE GANG TOOL POSTS

CROSS REFERENCE TO RELATED APPLICATION

This application is a continuation of application Ser. No. 08/201,390 filed Feb. 24, 1994, now U.S. Pat. No. 5,564,171, issued Oct. 16, 1996.

BACKGROUND OF THE INVENTION

1. Field of the Invention

The present invention relates to an automatic lathe, and, more particularly, to an automatic lathe which has a pair of gang tool posts (comb-shaped tool posts) disposed on respective sides of a headstock to be independently movable in two perpendicular directions, thereby shortening the machining time to eventually improve the productivity.

This invention also relates to an automatic lathe which has a pair of gang tool posts disposed on respective sides of a headstock to be independently movable in two perpendicular directions, with specially designed pitches between a plurality of work tools attached to each gang tool post.

Further, this invention relates to an automatic lathe which has a pair of gang tool posts disposed on respective sides of a headstock to be independently movable in two perpendicular directions, with an improved attachment structure for rear work tools.

2. Description of the Related Art

One example of an automatic lathe is designed as follows. This automatic lathe has a headstock which is designed movable in the direction of a Z axis parallel to the axial direction of a main spindle. A pair of gang tool posts are disposed in front of the headstock and on both sides (e.g., right and left sides) thereof, respectively. The gang tool posts are designed to be movable in the directions of an X axis and Y axis perpendicular to the Z-axial direction. The controls of the gang tool posts in the X-axial direction and Y-axial direction are not performed independently. For example, both gang tool posts make the same movement in the X-axial direction. In the Y-axial direction, the gang tool posts can make the same movement or one gang tool post moves forwardly in the Y-axial direction (upward) while the other gang tool post moves reversely in the Y-axial direction (downward) because both gang tool posts are coupled by a rack and pinion mechanism.

According to the above conventional structure, however, as a pair of gang tool posts make movements mutually associated with each other, both gang tool posts cannot be used simultaneously to machine workpieces, or their usage is limited so that while one is used to machine a workpiece, the other cannot be ready for the next machining (to wait near the workpiece). Therefore, only one gang tool post is used to sequentially machine workpieces, requiring a longer machining time. This inevitably reduces the productivity.

A structure for mounting a plurality of work tools on a pair of gang tool posts will be discussed below. Those work tools are arranged in alignment at given pitches, with their free ends aligned in a line. In machining a workpiece, there may be a case where the pair of gang tool posts are moved to cause the free end of one of the work tools mounted on each gang tool post to contact the outer surface of the workpiece, and machining, such as turning or boring, is then carried out with the two work tools brought at the respective sides of the workpiece.

To attach the work tools to each gang tool post, the work tools are positioned one by one and are then secured by attaching members. In actual attachment, however, an attachment error is likely to occur so that the free ends of all the work tools are not precisely aligned in a line. That is, the free ends of some work tools may have variations in a direction toward and away from the opposite gang tool post.

Some workpieces, which are to be subjected to turning, may have a very small outside diameter, and if the outside diameter is close to the mentioned attachment error of the work tools, the following problem may arise. Because the pitches between the work tools are constant, as the free ends of predetermined two work tools come close to each other at the time those two work tools are positioned at predetermined positions, the free ends of the other work tools also come close to those of the opposite work tools. At this time, if there are any opposite work tools each standing out more than the other on the same side due to the aforementioned attachment error, the free ends of such two work tools may abut on each other, the abutting work tools may have nicked blades or edges or the work tools may not perform proper machining.

There may be another case where a plurality of front work tools are mounted on a rear headstock in an automatic lathe with a plurality of rear work tools secured to the lathe body, so that the front work tools will machine the front side of a workpiece held on a main headstock while the rear work tools machine the rear side of a workpiece held on the rear headstock. In this case, the front work tools and the rear work tools should keep a predetermined size relation, thus requiring high level of parts and assembly accuracy or a separate expensive positioning mechanism.

This problem will be described below specifically with reference to FIG. 19. One of front work tools 315a, 315b and 315c bores a hole in the front face of a workpiece 311 held on a main spindle 303 while one of rear work tools 317a, 317b and 317c bores a hole in the back face of a workpiece 311a held on a rear spindle 307. In this case, first, a rear headstock 305 is moved in the X-axial direction to align the front work tool 315a with the center line of the main spindle 303 and align the center line of the rear spindle 307 with the rear work tool 317a. Under this situation, the headstock is moved in the Z-axial direction and the rear headstock 305 is moved in the $Z_1$-axial direction. Accordingly, the work tool 315a bores a hole in the front face of the workpiece 311 held on the main spindle 303 while the rear work tool 317a bores a hole in the back face of the workpiece 311a held on the rear spindle 307.

The same is true of the case where the front work tool 315b and rear work tool 317b are used to simultaneously machine the front face of one workpiece and the back face of another workpiece, respectively, and the case where the front work tool 315c and rear work tool 317c are used for similar simultaneous machining of the front and back faces of the respective workpieces.

To perform the aforementioned simultaneous machining, however, the interval ($a_1$) between the center of the rear spindle 307 and the front work tool 315a, the mutual intervals ($b_1$) and ($c_1$) between the front work tools 315a, 315b and 315c, the interval ($a_2$) between the center of the main spindle 303 and the rear work tool 317a, and the mutual intervals ($b_2$) and ($c_2$) between the rear work tools 317a, 317b and 317c should satisfy relations given by the following equations (I), (II) and (III).

$$a_1 = a_2 \qquad \text{(I)}$$

$$b_1 = b_2 \qquad \text{(II)}$$

$$c_1 = c_2 \qquad \text{(III)}$$

To obtain the relative positional relations expressed by the above equations (I) to (III), a positioning mechanism should be provided on the side of the rear work tools 317a, 317b and 317c, for example, or high level of parts and assembly accuracy is required if such a positioning mechanism is not provided. Both cases will result in an increased cost performance.

It is also necessary to respectively align the axial centers of the front work tools 315a, 315b and 315c with those of the rear work tools 317a, 317b and 317c in the vertical direction. This also requires a positioning mechanism or high level of parts and assembly accuracy, which will raise a similar problem on the cost performance.

SUMMARY OF THE INVENTION

It is therefore a primary object of the present invention to provide an automatic lathe which can perform simultaneous machining or continuous machining using a pair of gang tool posts (comb-shaped tool posts) to shorten the machining time, thus improving the productivity.

It is another object of this invention to provide an automatic lathe, which is equipped with a pair of gang tool posts that are independently driven and controlled, and which is designed to prevent opposite work tools from interfering with one another due to the attachment structure even if a workpiece has a small outside diameter.

It is a further object of this invention to provide an automatic lathe, which is equipped with a pair of gang tool posts that are independently driven and controlled, and which can perform simultaneous machining of the front face of one workpiece and the back face of another workpiece respectively using a front work tool and a rear work tool, without requiring high level of parts and assembly accuracy or an expensive positioning mechanism.

To achieve the foregoing objects, an automatic lathe embodying this invention comprises a pair of gang tool posts disposed on opposite sides with a headstock in between, the headstock having a main spindle and movable in an axial direction of the main spindle, the pair of gang tool posts being independently movable in respective two directions perpendicular to each other and perpendicular to the axial direction.

This design allows the automatic lathe to effectively function to shorten the machining time, thereby improving the productivity. For example, simultaneous machining will be performed using the tools mounted on a pair of gang tool posts, or while one tool is machining a workpiece, another tool can be positioned at a predetermined position to be ready for machining.

At that time, the pair of gang tool posts may independently be movable in respective two directions perpendicular to each other by a mechanism including ball nuts and ball screws.

It is preferable that pitches between work tools mounted on one of the gang tool posts differ from pitches between work tools mounted on the other gang tool post in such a way that when a free-end position of a selected work tool of one of the gang tool posts is aligned with that of a selected work tool of the other gang tool post, free-end positions of the other work tools of the one gang tool post mutually differ from free-end positions of the other work tools of the other gang tool post. With this structure, even when the gang tool posts come close to each other with the free-end position of a selected work tool of one gang tool post being aligned with that of a selected work tool of the other gang tool post, the other tools on one gang tool post which are not used in machining move toward gaps between the tools on the other gang tool post, not toward the opposite tools on the other gang tool post, thereby avoiding the mutual interference.

At that time, the work tools mounted on one of the gang tool posts may equidistantly be arranged at a first predetermined pitch, and the work tools mounted on the other gang tool post may equidistantly be arranged at a second predetermined pitch different from the first predetermined pitch.

The work tools mounted on both gang tool posts may be arranged at irregular intervals respectively.

It is also preferable that cutting tools mounted on one of the gang tool posts are equidistantly arranged at a first predetermined pitch (p), and cutting tools mounted on the other gang tool post are equidistantly arranged at a second predetermined pitch (p+a) different from the first predetermined pitch.

Further, it is preferable that rotary tools mounted on one of the gang tool posts are equidistantly arranged at a first predetermined pitch (p), and rotary tools mounted on the other gang tool post are equidistantly arranged at a second predetermined pitch (p+b) different from the first predetermined pitch where (b) is set greater than the outside diameter (d) of a rotary tool.

Further, the automatic lathe of this invention may be designed in such a way that front work tools are mounted on a rear headstock having a rear spindle arranged opposite to the .headstock, the rear headstock being movable in a direction parallel to the axial direction of the main spindle and also in a direction perpendicular to the direction, and that rear work tools are mounted on one of the pair of gang tool posts. This design allows the front work tools to be properly positioned by the rear headstock and the rear work tools to be properly positioned by the associated gang tool post, so that, unlike in the prior art, simultaneous machining of the front face of one workpiece and the rear face of another workpiece becomes possible without requiring high level of parts and assembly accuracy or an expensive positioning mechanism.

At that time, the front work tools may be moved in the axial direction of the main spindle independently of the rear headstock.

DETAILED DESCRIPTION OF THE PREFERRED EMBODIMENT

Figure 1:
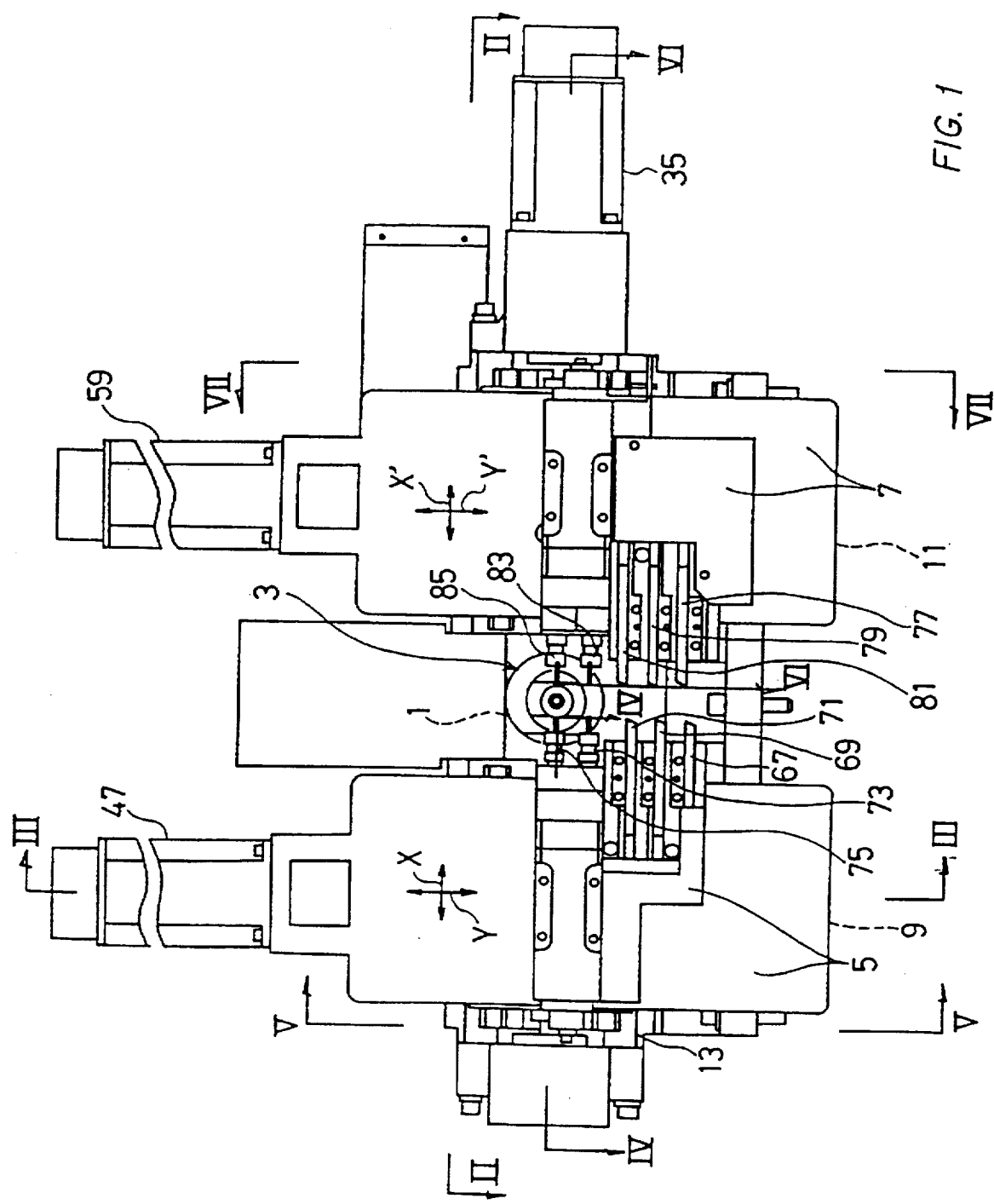
FIG. 1 is a front view of an automatic lathe according to a first embodiment of the present invention, as viewed toward a headstock.

A first embodiment of the present invention will now be described referring to FIGS. 1 through 9. FIG. 1 is a front view of an automatic lathe according to this embodiment, as viewed toward a headstock 1. The headstock 1 is designed to be movable in a Z-axial direction (perpendicular to the sheet) along an axis of its main spindle. A guide bush 3 is disposed in front of the headstock 1. A workpiece has one end held by the headstock 1 and the other end supported by this guide bush 3. A pair of gang tool posts (comb-shaped tool posts) 5 and 7 are disposed in front of the headstock 1 and respectively on left and right sides thereof. The gang tool post 5 is designed to be movable in an X-axial direction and Y-axial direction, which are perpendicular to the Z-axial direction and are perpendicular to each other. Likewise, the gang tool post 7 is designed to be movable in the X'-axial direction and Y'-axial direction, which are perpendicular to the Z-axial direction and are perpendicular to each other. The X-axial direction and X'-axial direction mean the same direction, which is true of the Y-axial direction and Y'-axial direction, and "'" is added for the sake of convenience.

Figure 2:
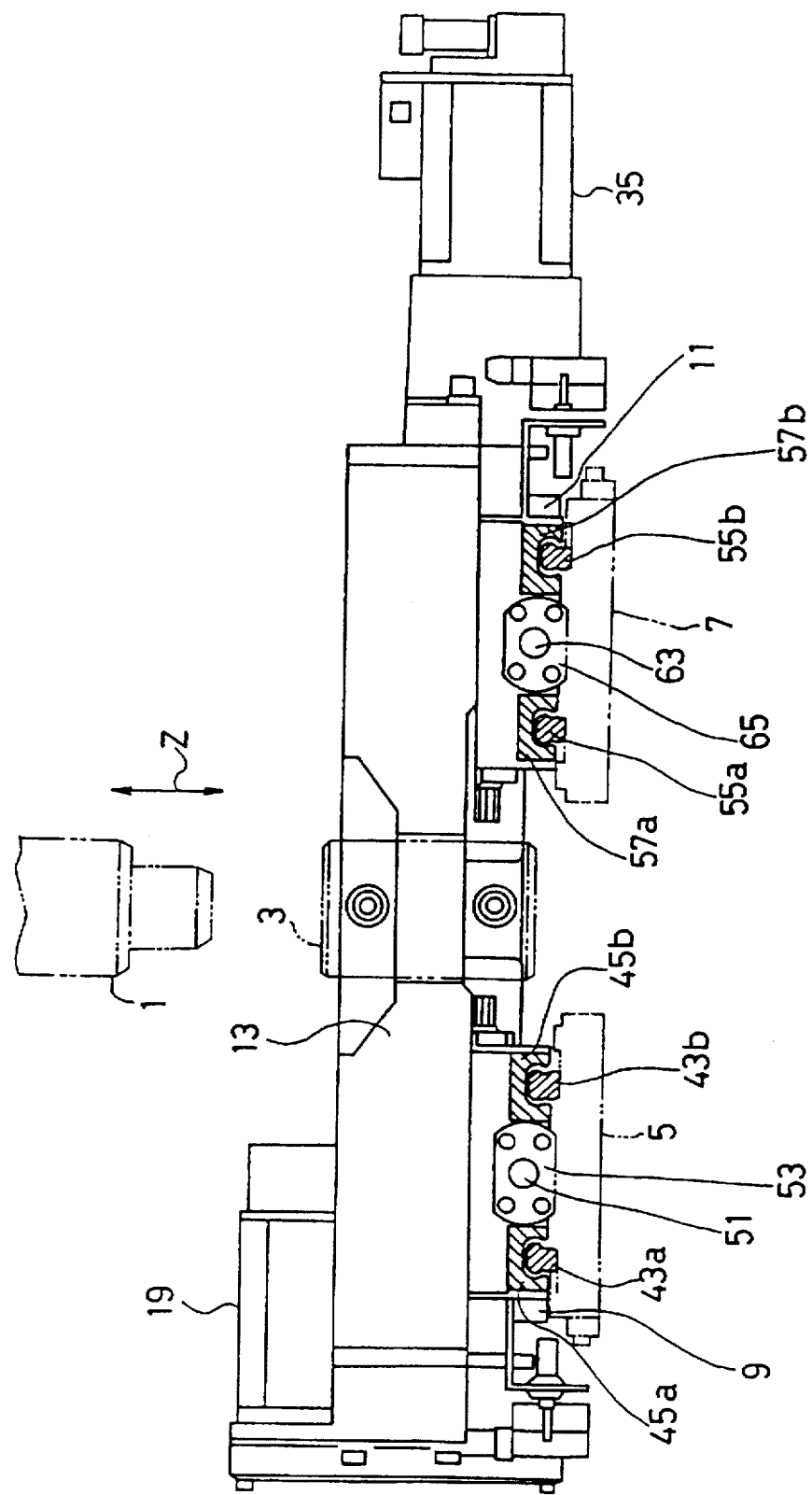
FIG. 2 is a cross-sectional view of the first embodiment as taken along the line II—II in FIG. 1.
Figure 3:
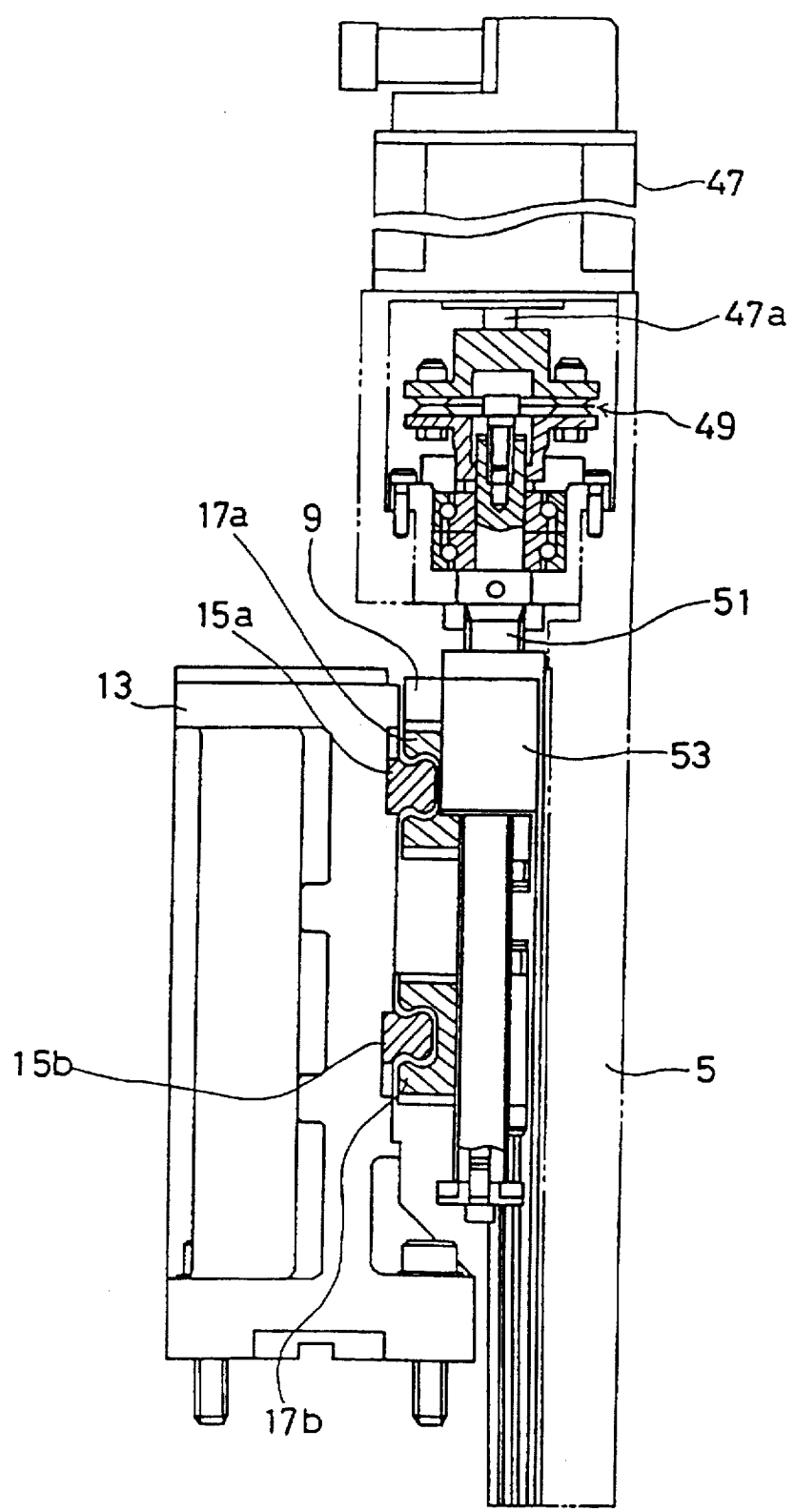
FIG. 3 is a cross-sectional view of the first embodiment as taken along the line III—III in FIG. 1.
Figure 4:
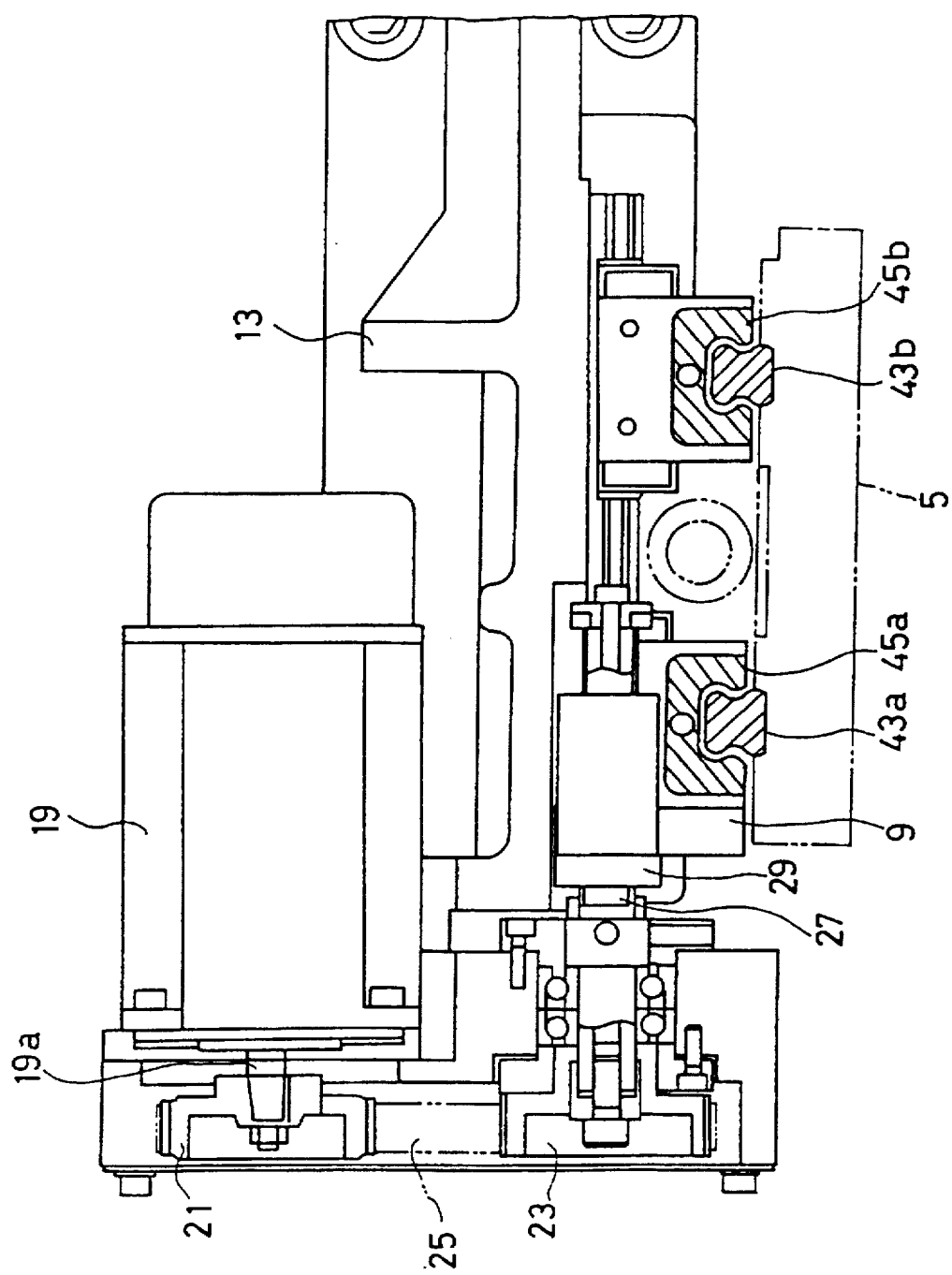
FIG. 4 is a cross-sectional view of the first embodiment as taken along the line IV—IV in FIG. 1.
Figure 5:
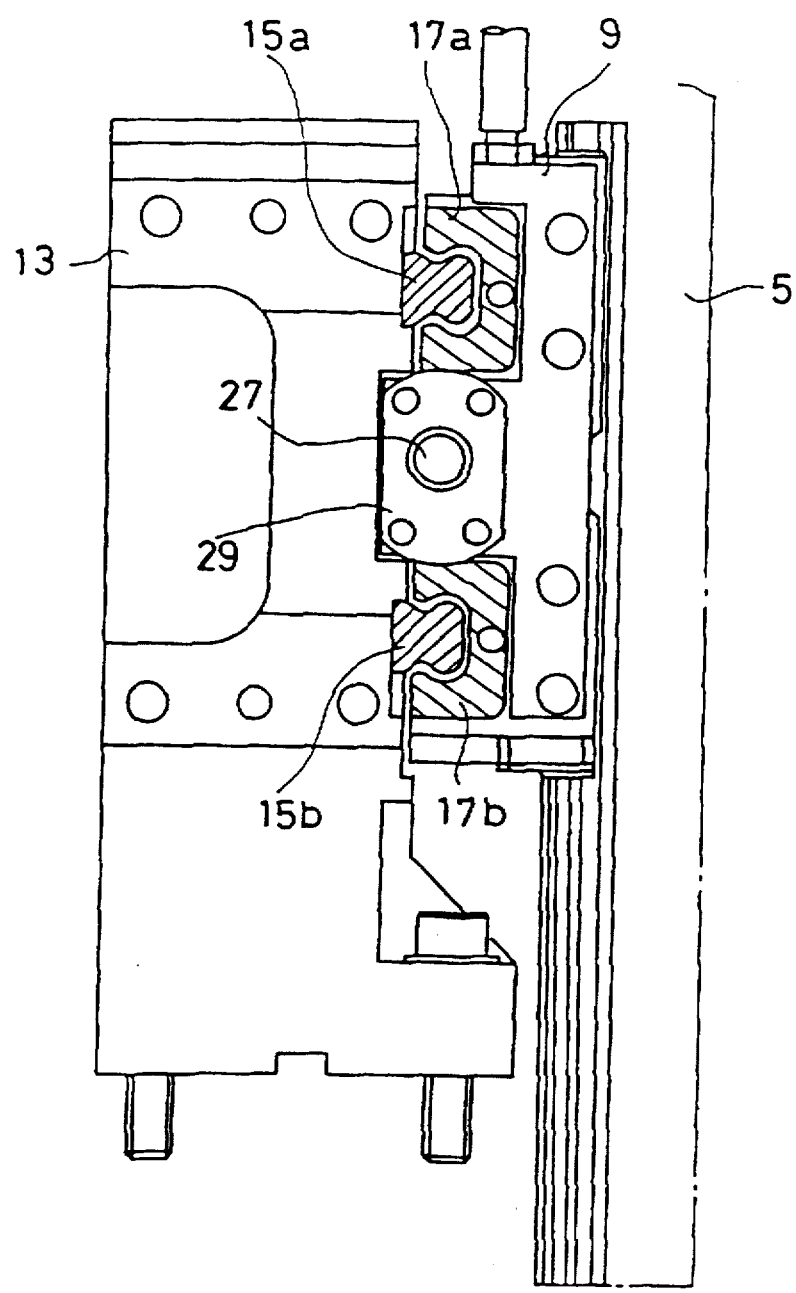
FIG. 5 is a cross-sectional view of the first embodiment as taken along the line V—V in FIG. 1.

A description will now be given of the structure that causes the gang tool post 5 and gang tool post 7 to move in the X-axial direction and X'-axial direction, respectively. The gang tool post 5 is movably attached on a slide base 9, and the gang tool post 7 is likewise movably attached on a slide base 11. The gang tool post 5 moves together with the slide base 9 in the X-axial direction, and the gang tool post 7 moves together with the slide base 11 in the X'-axial direction. Disposed under the slide base 9 is a base 13 as shown in FIG. 2, with X-axis slide rails 15a and 15b laid on the base 13 as shown in FIG. 3. Attached to the bottom side of the slide base 9 are X-axis guide members 17a and 17b which are respectively slidable along the X-axis slide rails 15a and 15b. An X-axis drive motor 19 is mounted on the base 13, with a pulley 21 secured to a drive shaft 19a of this motor 19, as shown in FIG. 4. Disposed below the pulley 21 in FIG. 4 is another pulley 23, with a belt 25 put around these pulleys 21 and 23. A ball screw 27 is coupled to the pulley 23, and a ball nut 29 which is to be engaged with the ball screw 27 is fixed on the slide base 9. As the X-axis drive motor 19 rotates in the forward or reverse direction, therefore, the slide base 9 with the gang tool post 5 mounted thereon moves in the X-axial direction via the pulley 21, belt 25, pulley 23, ball screw 27 and ball nut 29. The ball screw 27 may be coupled to the X-axis drive motor 19 via a coupling mechanism instead of the pulley 21 and the belt 25.

Figure 6:
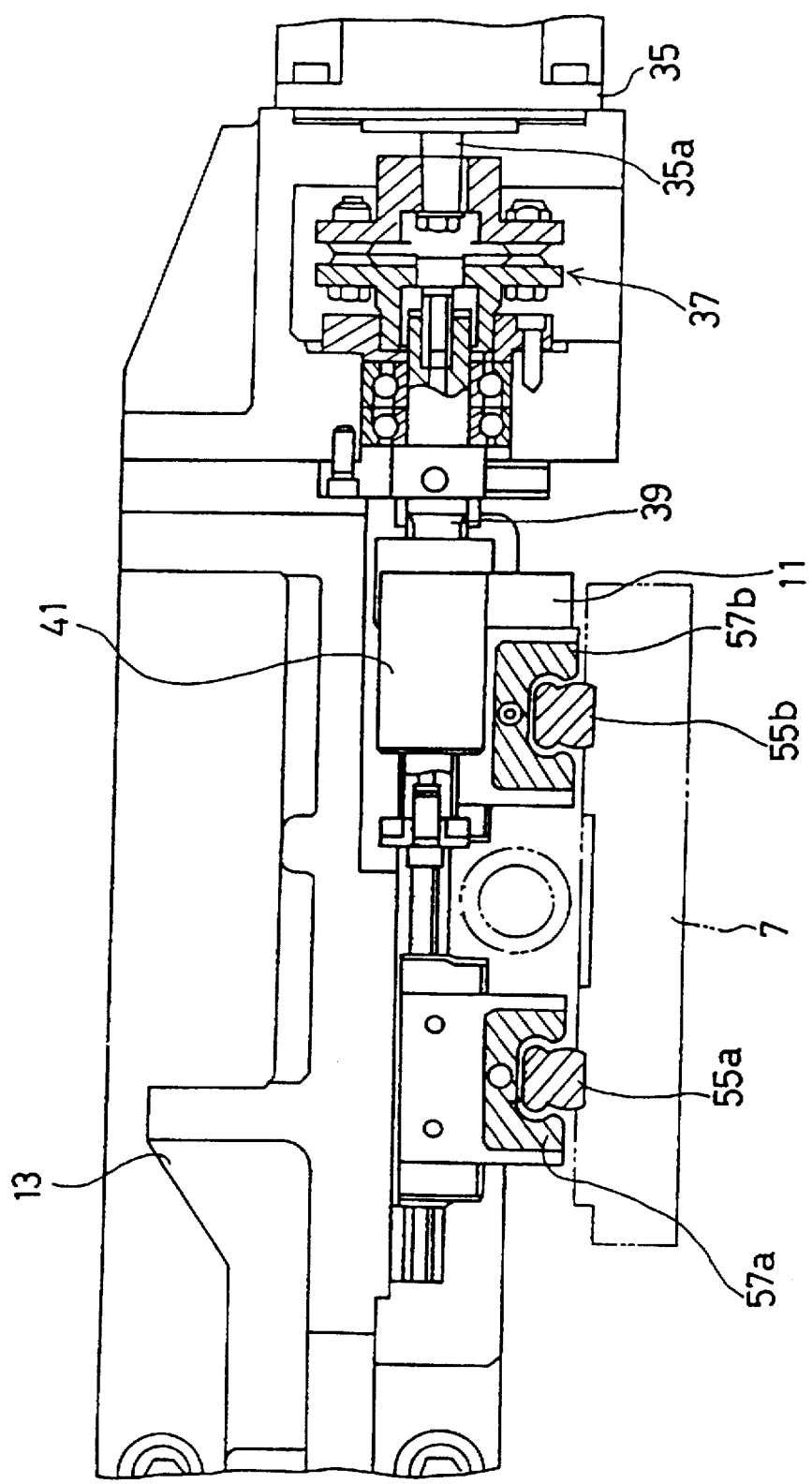
FIG. 6 is a cross-sectional view of the first embodiment as taken along the line VI—VI in FIG. 1.
Figure 7:
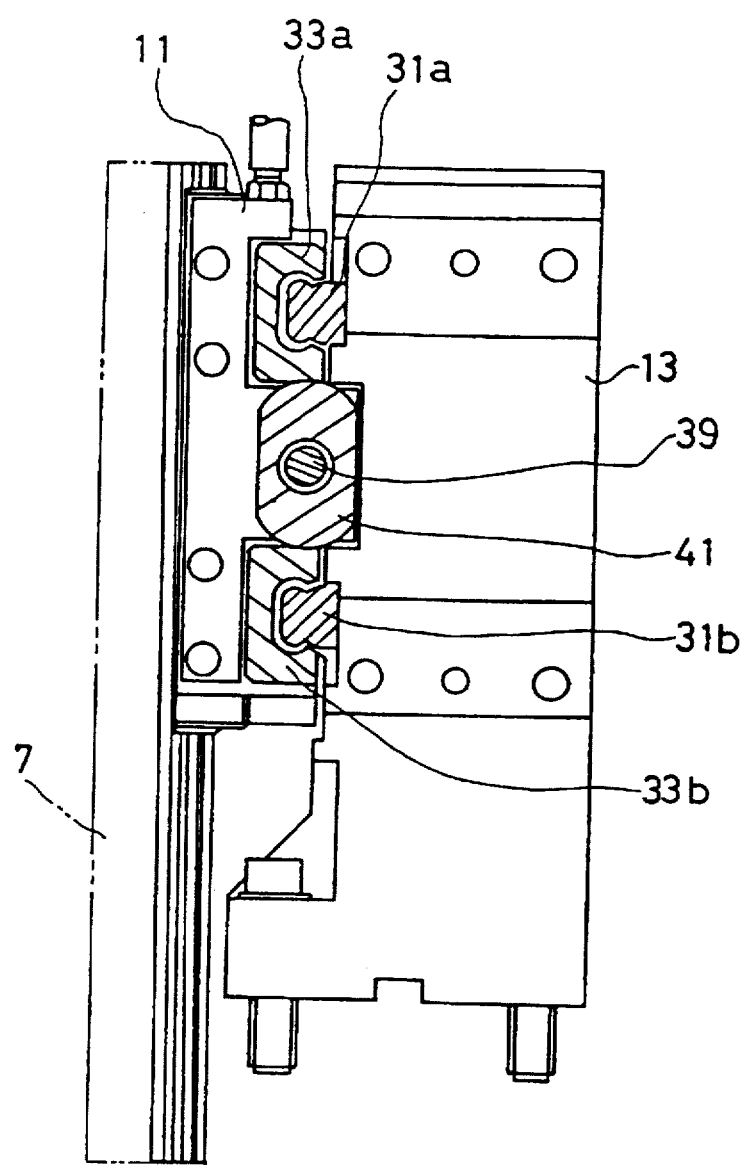
FIG. 7 is a cross-sectional view of the first embodiment as taken along the line VII—VII in FIG. 1.

With regard to the slide base 11 having the gang tool post 7 mounted thereon, likewise, X'-axis slide rails 31a and 31b are laid on the base 13, as shown in FIG. 7. Secured to the bottom side of the slide base 11 are X'-axis guide members 33a and 33b which are slidable respectively along the X'-axis slide rails 31a and 31b. As shown in FIGS. 1 and 6, an X'-axis drive motor 35 is provided and a ball screw 39 is coupled via a coupling mechanism 37 to a drive shaft 35a of the motor 35. A ball nut 41, which is to be engaged with the ball screw 39, is secured to the bottom side of the slide base 11. As the X'-axis drive motor 35 rotates in the forward or reverse direction, therefore, the slide base 11 with the gang tool post 7 mounted thereon moves in the X'-axial direction via the ball screw 39 and ball nut 41.

A description will now be given of the structure which causes the gang tool posts 5 and 7 to move on the respective slide bases 9 and 11 in the Y-axial direction and Y'-axial direction, respectively. As shown in FIG. 2, Y-axis slide rails 43a and 43b are laid on the top of the gang tool post 5. Secured to the slide base 9 are Y-axis guide members 45a and 45b which are slidable respectively on the Y-axis slide rails 43a and 43b. A Y-axis drive motor 47 is provided and a ball screw 51 is coupled via a coupling mechanism 49 to a drive shaft 47a of the motor 47, as shown in FIG. 3. A ball nut 53, which is to be engaged with the ball screw 51, is secured to the gang tool post 5. As the Y-axis drive motor 47 rotates in the forward or reverse direction, therefore, the gang tool post 5 moves in the Y-axial direction via the ball screw 51 and ball nut 53.

With regard to the slide base 11, likewise, Y'-axis slide rails 55a and 55b are laid on the top of the gang tool post 7, as shown in FIG. 2. Secured to the top of the slide base 11 are Y'-axis guide members 57a and 57b which are slidable respectively on the Y'-axis slide rails 55a and 55b. A Y'-axis drive motor 59 is provided and a ball screw 63 is coupled via a coupling mechanism to a drive shaft of the motor 59. The drive shaft and the coupling mechanism, though not shown, are the same as those mentioned above for the case of the Y-axial direction. A ball nut 65, which is to be engaged with the ball screw 63, is secured to the gang tool post 7. As the Y'-axis drive motor 59 rotates in the forward or reverse direction, therefore, the gang tool post 7 moves in the Y'-axial direction.

The structures of the gang tool posts 5 and 7 will be discussed below. As shown in FIG. 1, three cutting tools 67, 69 and 71 as work tools are detachably mounted on the gang tool post 5, and two rotary tools 73 and 75 are also detachably mounted thereon. Likewise, three cutting tools 77, 79 and 81 as work tools are detachably mounted on the gang tool post 7, and two rotary tools 83 and 85 are also detachably mounted thereon. The types and the number of work tools, which are to be mounted on the gang tool posts 5 and 7, may be determined arbitrarily.

Figure 8:
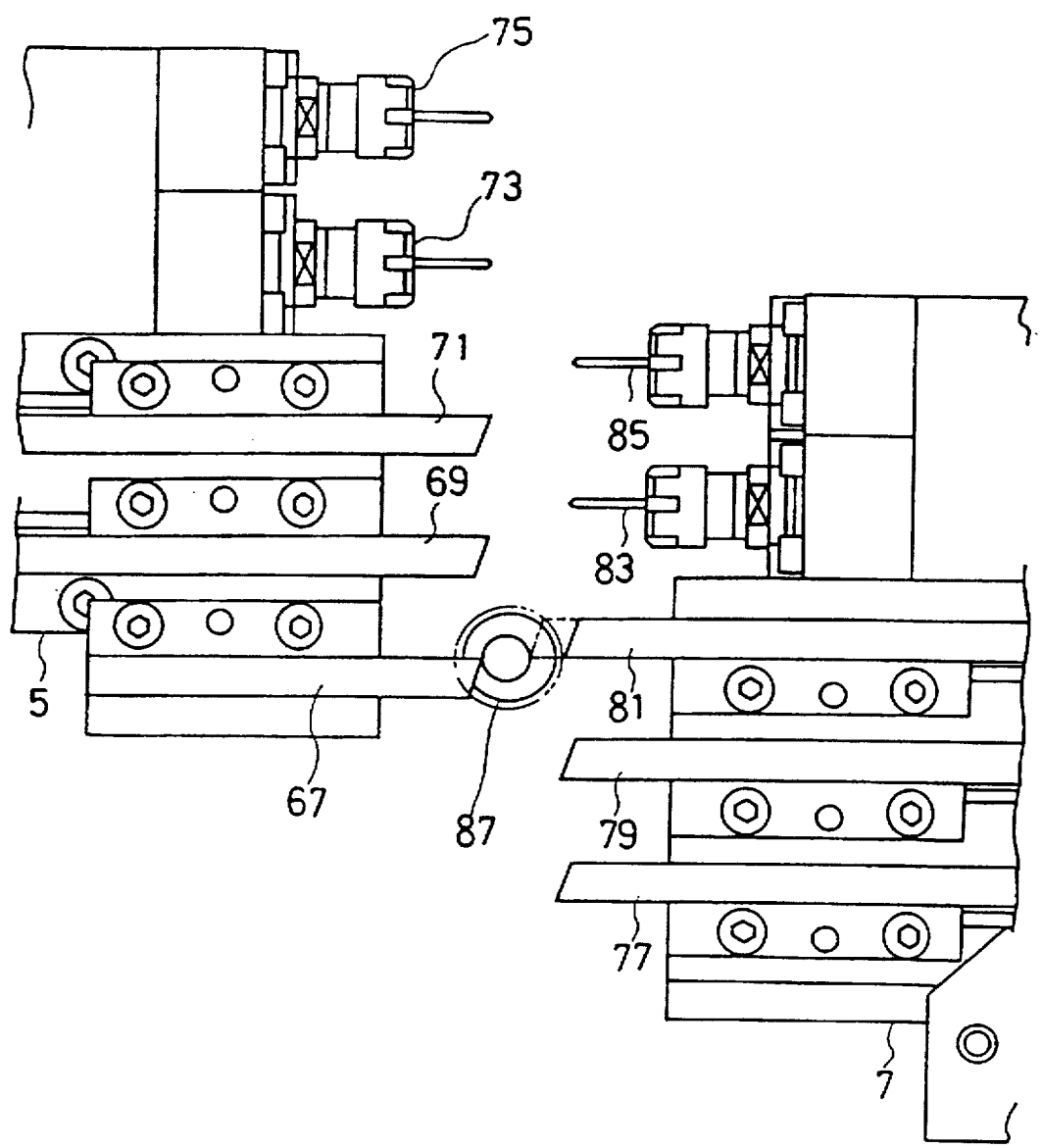
FIG. 8 is a diagram showing that while machining is performed by a cutting tool attached to one gang tool posts (comb-shaped tool post), a cutting tool attached to the other gang tool post is held at a predetermined position according to the first embodiment.

The action of the automatic lathe with the above-described structure will now be described with reference to FIGS. 8 and 9. In FIG. 8, the cutting tool 67 on the gang tool post 5 machines a workpiece 87. At this time, the cutting tool 81 of the other gang tool post 7 is held slightly apart from the maximum-diameter portion of the workpiece 87 (at the position indicated by a solid line in the diagram) to be ready to start the next machining immediately after the cutting by the cutting tool 67 is complete. When the machining starts, the cutting tool 81 moves quickly to the machining position indicated by an dashed line from the waiting position indicated by the solid line. That is, the time to initiate the next machining is shortened to shorten the machining time, thus improving the productivity.

Figure 9:
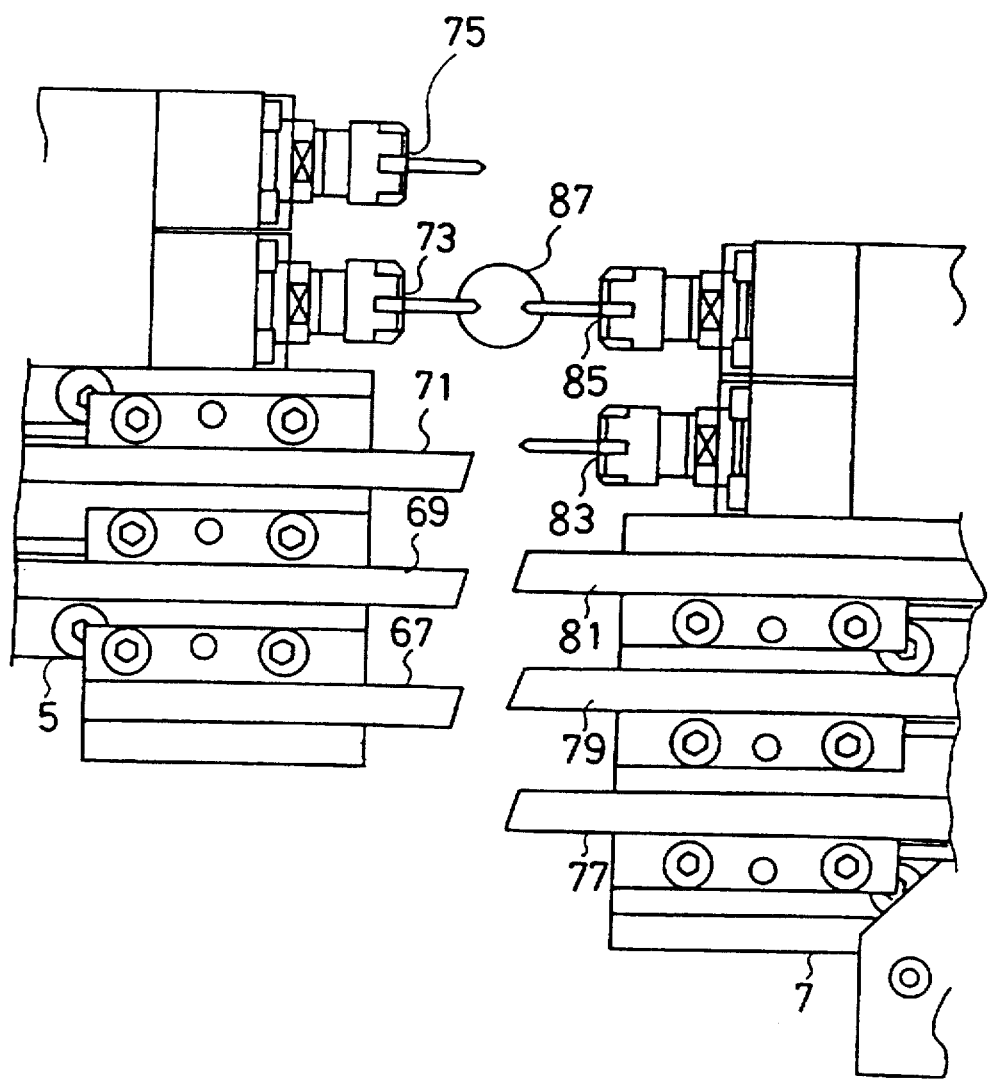
FIG. 9 is a diagram showing that simultaneous machining is carried out with rotary tools mounted on a pair of gang tool posts according to the first embodiment.

In the case of FIG. 9, the rotary tool 73 on the gang tool post 5 and the rotary tool 85 on the gang tool post 7 bore holes in the workpiece 87 from both sides. In this case, the machining time is halved as compared with the case of machining with only one rotary tool, which also shortens the machining time, thus improving the productivity. While FIG. 9 illustrates the use of rotary tools, simultaneous cutting with two cutting tools is of course possible.

As described above, this embodiment can shorten the machining time, thus improving the productivity. More specifically, as shown in FIG. 8, while the cutting tool 67 on the gang tool post 5 machines the workpiece 87, the cutting tool 81 on the gang tool post 7 is held close to the workpiece 87 so that the cutting tool 81 can initiate the next machining quickly. As shown in FIG. 9, the rotary tools 73 and 85 respectively mounted on the gang tool posts 5 and 7 may be used to bore holes in a workpiece simultaneously. Those actions are not possible in the conventional case where a pair of gang tool posts move relative to each other, and cannot be taken unless the gang tool posts are designed to independently move in mutually perpendicular directions (X-axial direction and Y-axial direction or X'-axial direction and Y'-axial direction) as per this embodiment.

While there is an automatic lathe equipped with a pair of turrets which are independently movable, this embodiment which has a pair of gang tool posts 5 and 7 designed to be independently movable has a significant advantage over the turret type automatic lathe. That is, the automatic lathe with gang tool posts basically has an advantage over the turret type in easy machining along the Y axis. In addition to the effect concerning the machining along the Y axis, as the gang tool posts 5 and 7 are designed to be independently movable in mutually perpendicular directions (X-axial direction and Y-axial direction or X'-axial direction and Y'-axial direction), it is possible to easily and quickly perform special machining.

The types and the number of work tools, which are to be mounted on the gang tool posts 5 and 7, may be determined arbitrarily. The illustrated structure for moving the gang tool posts 5 and 7 in perpendicular two directions is just one example, and various structures may be employed. The illustrated structure of the automatic lathe itself is also just one example, and this invention may be adapted for automatic lathes with various other structures, such as an automatic lathes having opposite headstocks and an automatic lathe having other tool posts. Although a pair of gang tool posts are arranged on right and left sides of the headstock, the positions are not limited to the this particular arrangement.

Second Embodiment

Figure 10:
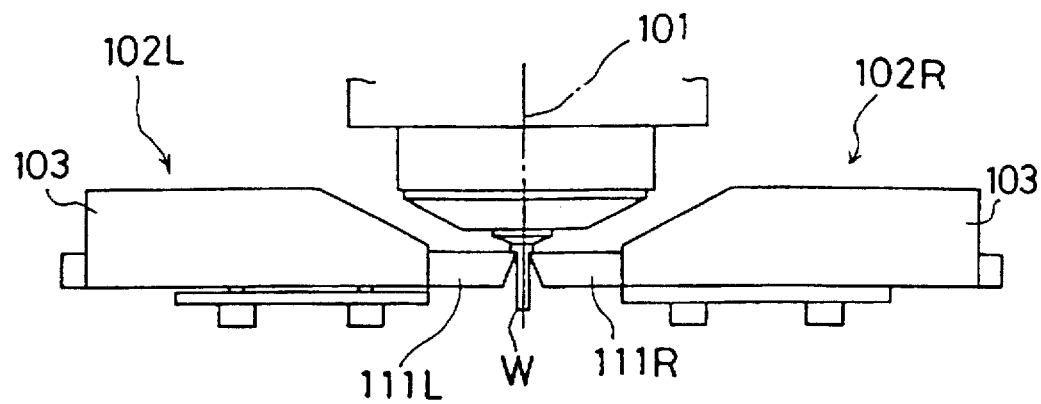
FIG. 10 is a plan view showing the structure of a pair of gang tool posts and parts in vicinity thereof according to a second embodiment of this invention.
Figure 11:
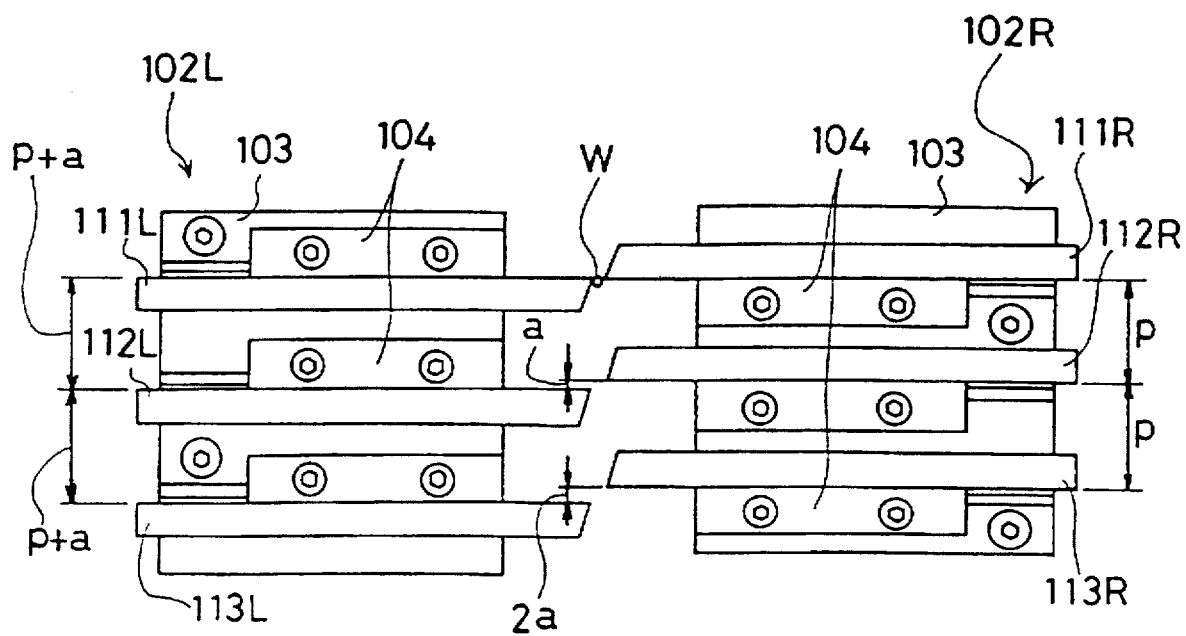
FIG. 11 is a front view showing the pair of gang tool posts according to the second embodiment.

A second embodiment of this invention will be described below referring to FIGS. 10 to 12. A workpiece W is rotatably held on a main spindle (only the axis shown) 101, protruding forward in the horizontal direction. A pair of gang tool posts 102L and 102R are disposed on left and right sides at the position where the workpiece W is protruded. The gang tool posts 102L and 102R are independently movable in the up and down direction and the right and left direction by a driving mechanism (not shown) which includes a ball screw and a servo motor. The structure of moving the gang tool posts 102L and 102R in the up and down direction and the right and left direction is the same as the one which has been explained earlier with reference to the first embodiment.

The gang tool post 102L located on the left side has three cutting tools (work tools) 111L, 112L and 113L, with the blades facing rightward, aligned at a predetermined pitch (p+a) in the up and down direction and secured individually to a tool holder 103 by clamp pieces 104. Since the occurrence of an attachment error of the cutting tools is inevitable for such a gang tool post, the positions of the blades of the cutting tools 111L, 112L and 113L are not precisely arranged in a line in the up and down direction and are shifted slightly in the right and left direction or in a direction to be closer to or away from the right gang tool post 102R.

The gang tool post 102R located on the right side has three cutting tools (work tools) 111R, 112R and 113R, with the blades facing leftward, aligned at a predetermined pitch (p) in the up and down direction and secured individually to the tool holder 103 by the clump pieces 104. Since there is also an inevitable attachment error of the cutting tools for this gang tool post 102R, the positions of the blades of the cutting tools 111R, 112R and 113R are not precisely arranged in a line in the up and down direction and are shifted slightly in the right and left direction or in a direction to be closer to or away from the left gang tool post 102L.

At the time of machining the workpiece W with both gang tool posts 102L and 102R, the gang tool posts 102L and 102R are separately moved in the up and down direction and the right and left direction, so that one cutting tool on the gang tool post 102R and one 102R cutting tool on the other gang tool post 102L sandwich the workpiece W from right and left sides, with their blades abutting on the outer surface of the workpiece W at the same height to machine the workpiece W.

With the above structure, if the workpiece W is very thin of an outside diameter of 1 mm or below, for example, when selected cutting tools are moved to predetermined positions to sandwich the workpiece W, the blades of the other cutting tools which are not used come very close to one another. As will be apparent from the following description, however, the blades of the other cutting tools will not interfere with one another.

Figure 12:
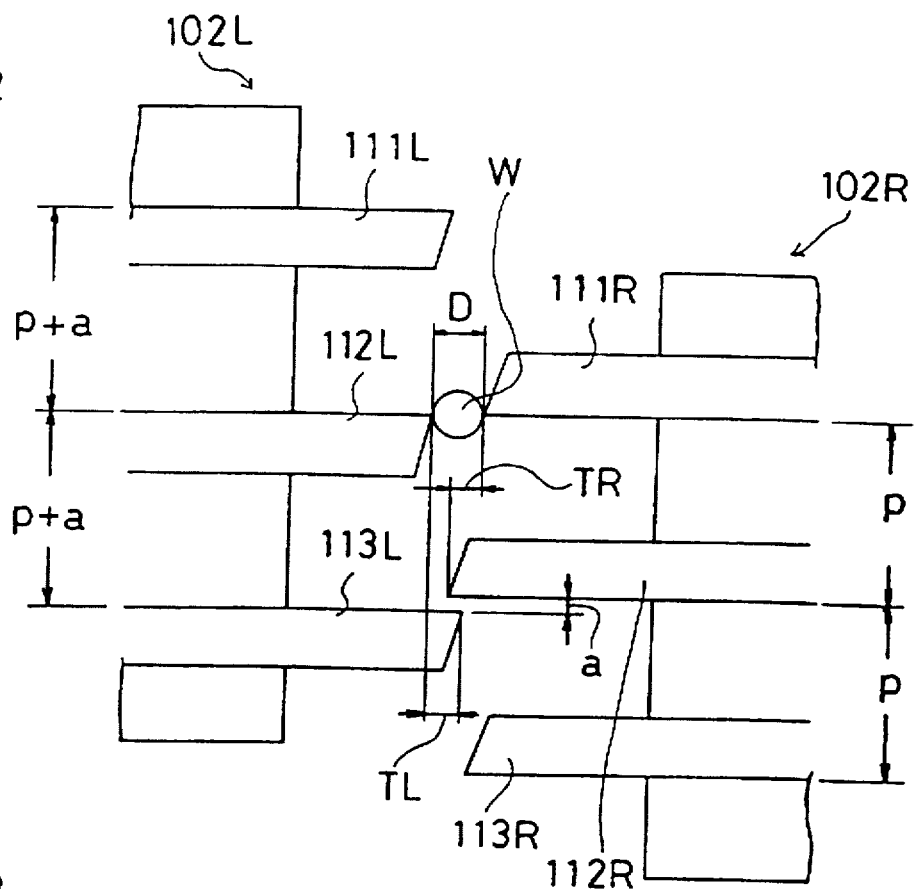
FIG. 12 is a front view also showing the pair of gang tool posts according to the second embodiment.

Suppose that the middle cutting tool 112L, mounted on the left gang tool post 102L, and the topmost cutting tool 111R on the right gang tool post 102R are used to turn the workpiece W, as shown in FIG. 12. In this case, the blades of the cutting tools 113L and 112R located directly below both cutting tools 112L and 111R to be used come close to each other. Also assume that the cutting tool 113L located under the cutting tool 112L, protrudes by a distance TL from the cutting tool 112L on the left gang tool post 102L, while the cutting tool 112R located under the cutting tool 111R protrudes by a distance TR from the cutting tool 111R on the right gang tool post 102R. If the sum of the protruding distances (TL+TR) is larger than the diameter (D) of the workpiece W, the blade of the left cutting tool 113L is positioned over the blade of the right cutting tool 112R rightward. Since the pitch between the cutting tools of the left gang tool post 102L is (p+a), larger by a pitch (p) than the pitch (a) of the cutting tools of the right gang tool post 102R, the blades of the closely-positioned cutting tools 113L and 112R is set apart from each other by the distance (a) in the up and down direction. Therefore, as those two cutting tools 113L and 112R are positioned close to each other, they will not interfere with each other.

Even if the combination of the cutting tools in use to turn the workpiece W differs from the one shown in FIG. 12, the cutting tools will not interfere with each other. For example, when the topmost cutting tools 111L and 111R are used to turn a workpiece as shown in FIG. 11, the middle cutting tools 112L and 112R are positioned close to each other and the bottom cutting tools 113L and 113R are likewise positioned close to each other. But, the middle cutting tools 112L and 112R are positioned apart from each other by the distance (a) in the up and down direction while the bottom cutting tools 113L and 113R are positioned apart from each other by the distance (2a) in that direction. Therefore, the opposite cutting tools will not interfere with each other. If the topmost cutting tool on one gang tool post and the bottom cutting tool on the other gang tool post are used, the other cutting tools on the former gang tool post do not come close to the other cutting tools on the other gang tool post, causing no interference.

Third Embodiment

Figure 13:
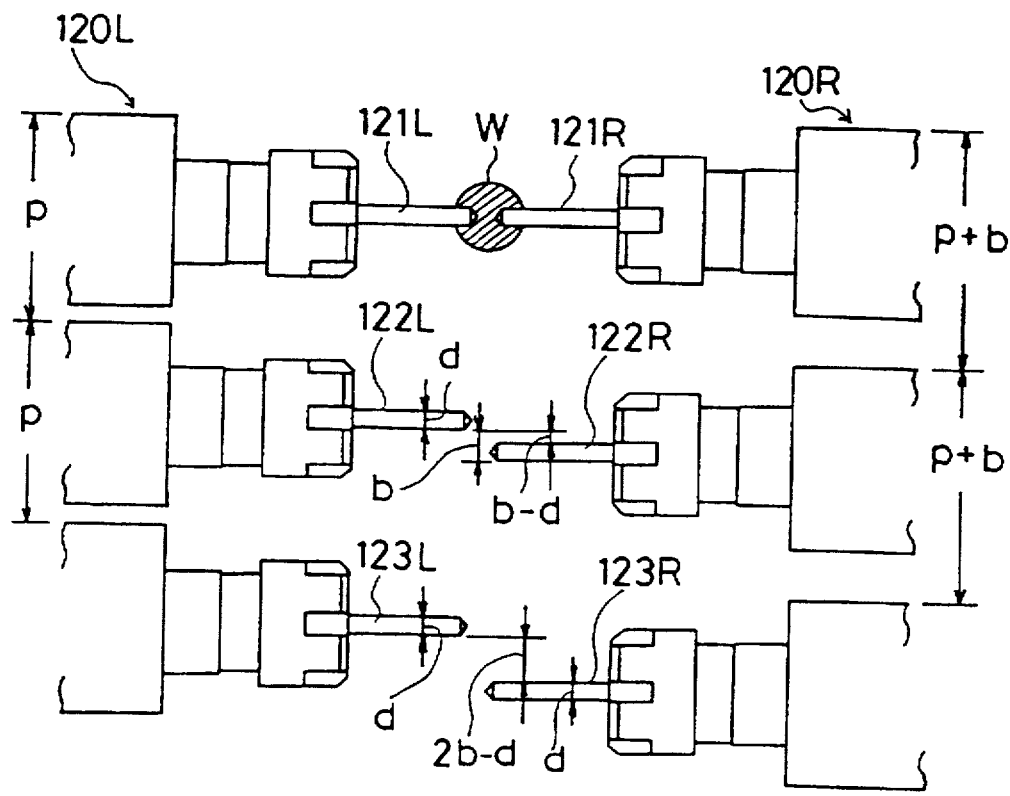
FIG. 13 is a front view showing a pair of gang tool posts according to a third embodiment of this invention.

A third embodiment of this invention will now be described referring to FIG. 13. In this third embodiment, drills, one type of rotary tools, are used as work tools to bore holes in the outer surface of a workpiece W. A pair of gang tool posts 120L and 120R are provided on both sides of the workpiece W as per the second embodiment. Three drills 121L, 122L and 123L are mounted in alignment on the left gang tool post 120L at a pitch (p) in the up and down direction. Likewise, three drills 121R, 122R and 123R are mounted in alignment on the right gang tool post 120R at a pitch (p+b) in the up and down direction. The distance (b) is set larger than the diameter (d) of each drill.

When the topmost drills 121L and 122R are used, the middle drills 122L and 122R, positioned close to each other, are apart from each other by the distance (b−d) in the up and down direction, and the bottom drills 123L and 123R, positioned close to each other, are likewise apart from each other by the distance (2b−d) in the up and down direction. Even with some drill-attaching error, the opposite drills will not interfere with each other. Even if the combination of the drills differs from the combination of the topmost drills, any pair of the other opposite drills, which are not used in drilling and are positioned close to each other, are set apart from each other in the up and down direction and will not thus interfere with each other.

Fourth Embodiment

Figure 14:
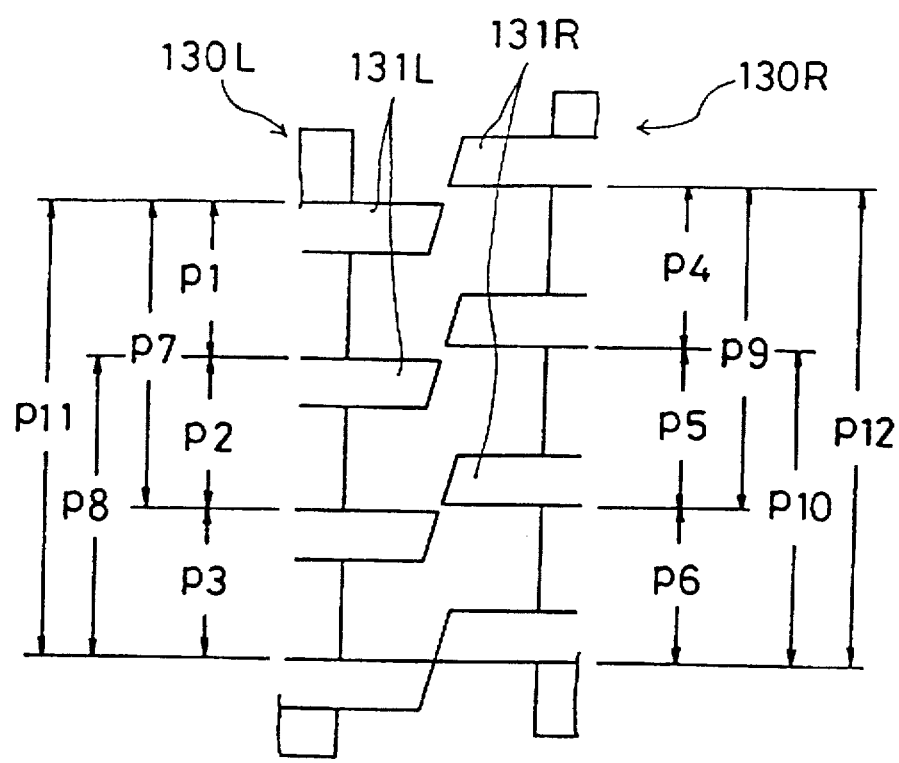
FIG. 14 is a front view showing a pair of gang tool posts according to a fourth embodiment of this invention.

A fourth embodiment of this invention will now be described referring to FIG. 14. In the second and third embodiments, the pitches between the work tools mounted on each gang tool post are constant and are equidistantly arranged on each gang tool post. In the fourth embodiment, four cutting tools (work tools) 131L and four cutting tools 130R are respectively mounted on gang tool posts 130L and 130R, and pitches $p_1$ to $p_6$ between the adjoining cutting tools 130L or 130R should not necessarily be constant but are set to arbitrarily values that satisfy all of the following three conditions.

The first condition is that the pitches $p_1$, $p_2$ and $p_3$ for the left gang tool post 130L should differ from the pitches $p_4$, $p_5$ and $p_6$ for the right gang tool post 130R. The second condition is that a pitch $p_7$ between two of the cutting tools 131L with one cutting tool in between and a pitch $p_8$ between another two cutting tools 131L with one cutting tool in between should differ from a pitch $p_9$ between two of the cutting tools 131R with one cutting tool in between and a pitch $p_{10}$ between another two cutting tools 131R with one cutting tool in between. The third condition is that a pitch $p_{11}$ between the topmost and bottom cutting tools 131L with two cutting tools in between should differ from a pitch $p_{12}$ between the topmost and bottom cutting tools 131R with two cutting tools in between The first condition includes not only the case where the pitches $p_1$ to $p_6$ are all different from one another, but also the case where any two of the pitches $p_1$, $p_2$ and $p_3$ are the same, the case where any two of the pitches $p_4$, $p_5$ and $p_6$ are the same, the case where all of the pitches $p_1$, $p_2$ and $p_3$ are the same and the case where all of the pitches $p_4$, $p_5$ and $p_6$ are the same. According to the fourth embodiment, under the above conditions, the distance between any adjoining cutting tools and the distances between any non-adjoining cutting tools in the gang tool post 130L do not match with those distances in the gang tool post 130R, regardless of the combination of the cutting tools 131L and 131R to be positioned to face each other to turn a workpiece. Therefore, the cutting tools 131L on the gang tool post 130L are prevented from interfering with the respective opposite cutting tools 131R of the gang tool post 130R.

Although the foregoing description of the second to fourth embodiments has been given with reference to the case where three or four work tools are mounted on each gang tool post, this invention may also be adapted for the case where a total of two work tools are mounted or a total of five or more work tools are mounted on each gang tool post. While the work tools mounted on one gang tool post are equal in number to those mounted on the other gang tool post in the above-described embodiments, this invention may also be adapted for the case where the number of the work tools for one gang tool post differs from that for the other gang tool post.

Fifth Embodiment

Figure 15:
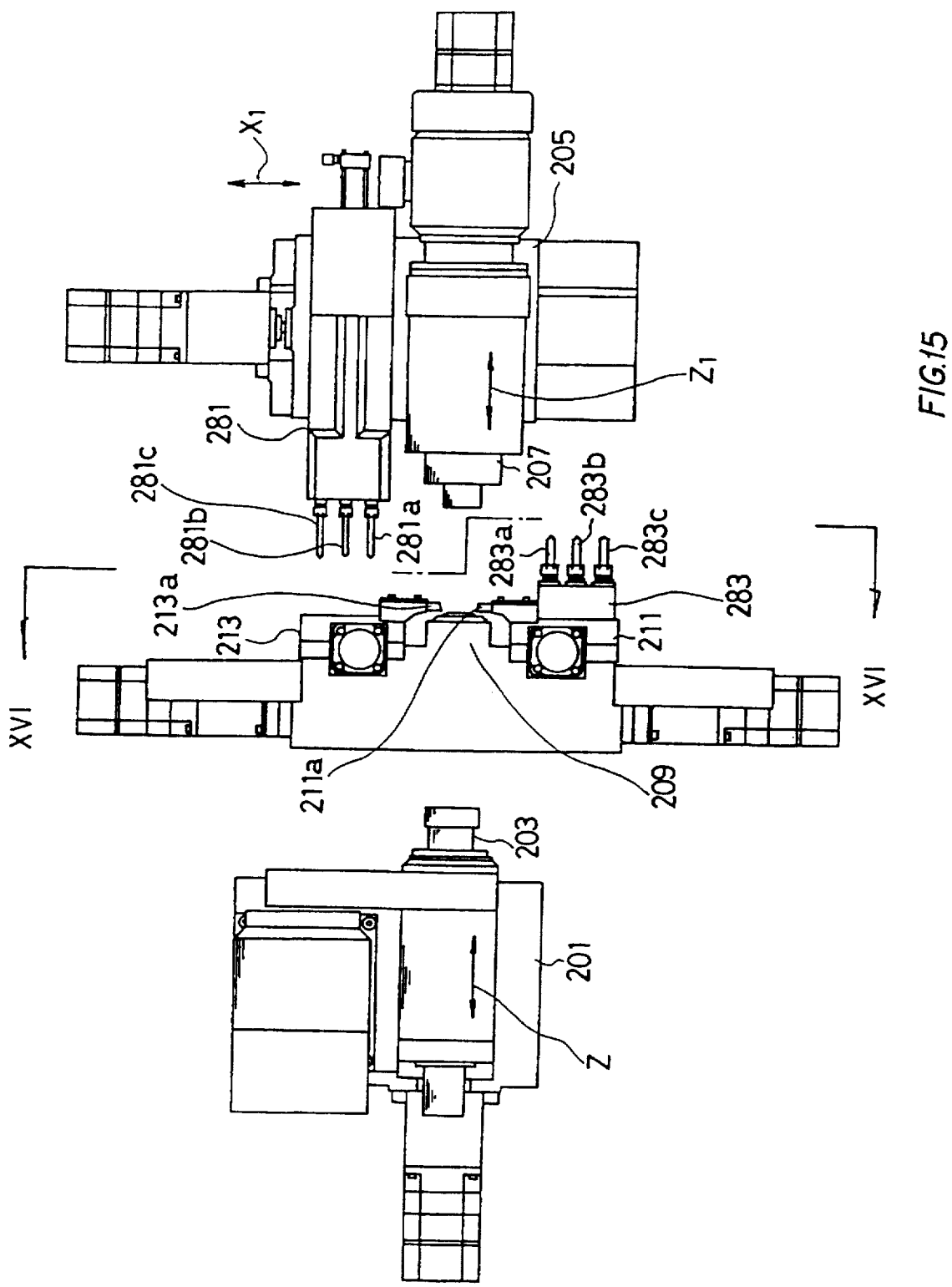
FIG. 15 is a plan view of an automatic lathe according to a fifth embodiment of this invention.

A fifth embodiment of this invention will now be described with reference to FIGS. 15 through 19. As shown in FIG. 15, a headstock 201, which rotatably supports a main spindle 203, is movably provided in the Z-axial direction parallel to the direction of an axis of the main spindle 203. A rear headstock 205 is disposed opposite to the headstock 201. A rear spindle 207 is mounted on this rear headstock 205. The rear headstock 205 is movable in the $Z_1$-axial direction (right and left direction in FIG. 15) parallel to the Z-axial direction and is also movable in the X-axial direction (up and down direction in FIG. 15) orthogonal to the $Z_1$-axial direction.

A guide bush 209 is disposed between the headstock 201 and the rear headstock 205. A workpiece 210 (shown in FIG. 17) has its proximal end held on the headstock 201 and its free end supported by this guide bush 209. Under this situation, the front face of the workpiece 210 will be machined.

A pair of gang tool posts 211 and 213 are disposed between the headstock 201 and the rear headstock 205 and respectively on left and right sides of the guide bush 209. The gang tool post 211 is movable in mutually perpendicular X-axial and Y-axial directions in a plane perpendicular to the Z-axial direction. Likewise, the gang tool post 213 is movable in mutually perpendicular X'-axial and Y'-axial directions in a plane perpendicular to the Z-axial direction. The X-axial direction and X'-axial direction mean the same direction, which is true of the Y-axial direction and Y'-axial direction, and "'" is added for the sake of convenience.

The structure for moving the gang tool posts 211 and 213 in the X-axial direction and Y-axial direction and in the X'-axial direction and Y'-axial direction, respectively is the same as the one already explained with reference to the first embodiment, its description will not be repeated.

Figure 16:
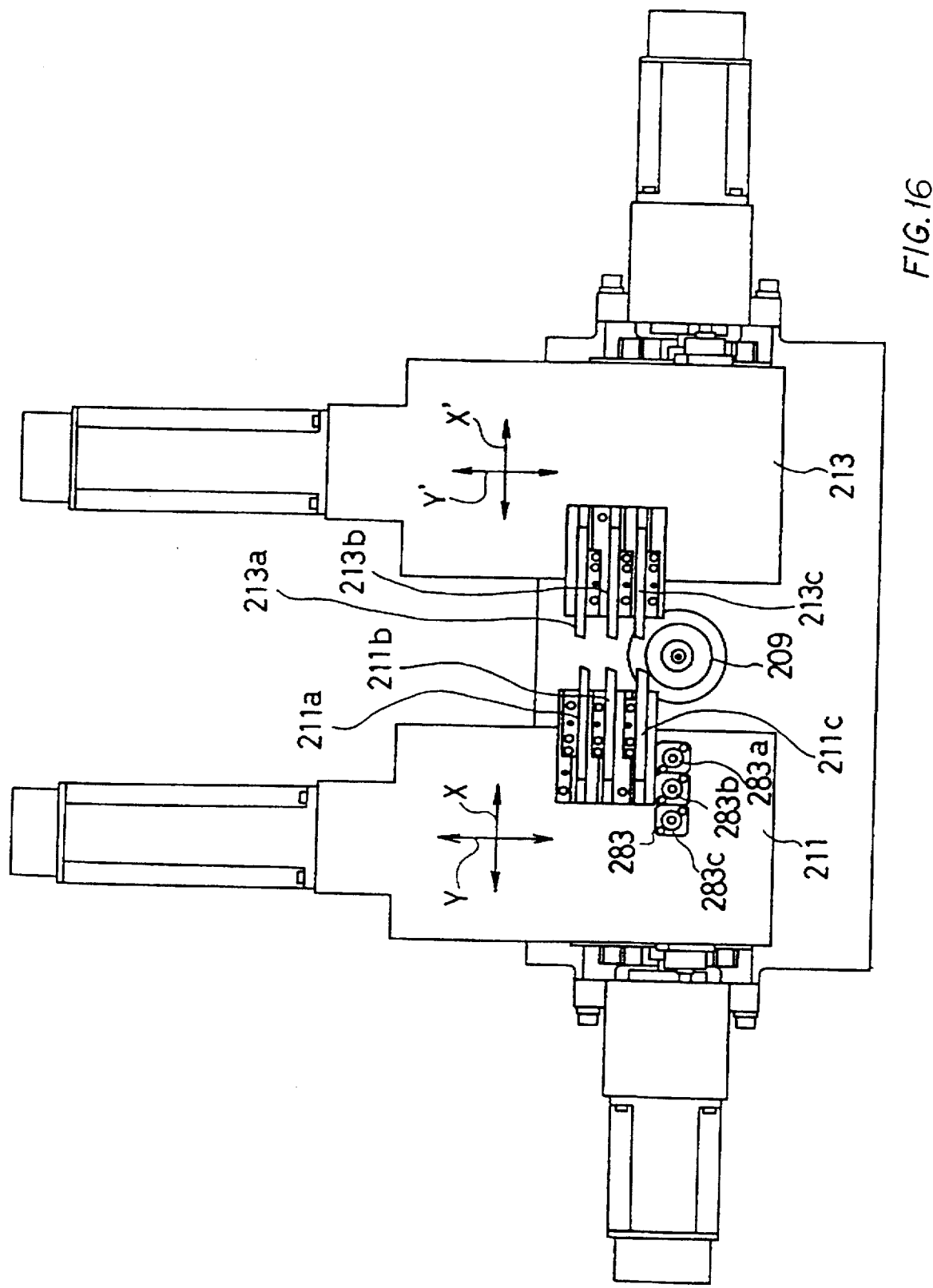
FIG. 16 is a view showing the fifth embodiment from the direction of the line XVI—XVI in FIG. 15.

With regard to the structures of the gang tool posts 211 and 213, as shown in FIG. 16, three cutting tools 211a, 211b and 211c as work tools are detachably mounted on the gang tool post 211, and likewise three cutting tools 213a, 213b and 213c as work tools are detachably mounted on the gang tool post 213.

Returning to FIG. 15, a front work tool post 281 is provided on the rear headstock 205, with three front work tools 281a, 281b and 281c mounted. The front work tool post 281 is designed to be movable in the $Z_1$-axial direction independently of the rear headstock 205, and is to be positioned either an advanced position or retracted position. More specifically, the front work tools 281a, 281b and 281c are positioned at the retracted position when the rear headstock 205 chucks a workpiece whose front face has been machined. This prevents the front work tools 281a, 281b and 281c from interfering with the gang tool post 213 when the rear headstock 205 moves in the $Z_1$-axial direction. When the front work tools 281a, 281b and 281c are used to machine the front face of the workpiece, they are positioned at the advanced position. According to this embodiment, as shown in FIGS. 15 and 16, a rear work tool post 283 is attached to the gang tool post 211, with three rear work tools 283a, 283b and 283c mounted on this rear work tool post 283.

The action of the automatic lathe having the above-described structure will be discussed below. The workpiece 210 has its proximal end held by the main spindle 203 and its free end supported by the guide bush 209. Under this situation, arbitrary machining (front machining) is performed on the workpiece 210 with an arbitrary one of the work tools 211a to 211c (or the work tools 213a to 213c) of the gang tool post 211 (or the gang tool post 213) under the combination of the slide control (Z-axial direction) of the headstock 201 and the slide controls (X-, X'-, Y- and Y'-axial directions) of each of the gang tool posts 211 and 218. After this machining is finished, the distal end of the workpiece 210 is held by the rear spindle 207 At this time, the front work tools 281a, 281b and 281c are retracted at the retracted position. Then, the workpiece 210 is cut off with an arbitrary one of the work tools 211a to 211c (or the work tools 213a to 213c) of the gang tool post 211 (or the gang tool post 213). A cut-off portion 210a of the workpiece 210 is held by the rear spindle 207, while the remaining workpiece 210 is held by the main spindle 203.

Figure 17:
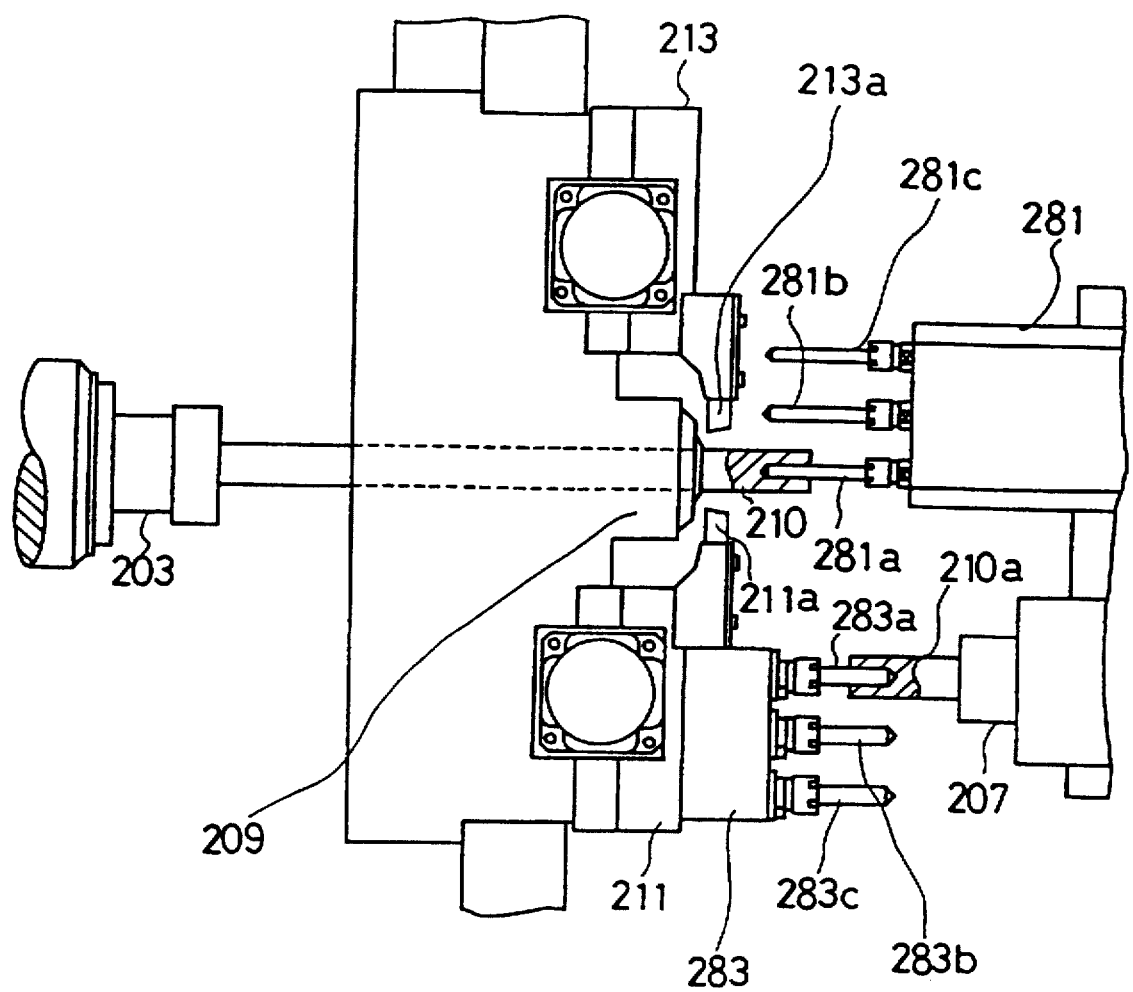
FIG. 17 is a plan view showing the structure of a pair of gang tool posts and parts in vicinity thereof according to the fifth embodiment.

Under the above-described situation, the front and rear machining may be performed simultaneously, as exemplified in FIG. 17. In the example shown in FIG. 17, a hole is bored in the front face of the workpiece 210 with the front work tool 281a, 281b or 281c, while a hole is bored in the back face of the workpiece 210a held by the rear spindle 207, using the rear work tool 283a, 283b or 283c. At this time, the front work tools 281a, 281b and 281c are at the advanced position. In this case, first, the rear headstock 205 is moved to align the front work tool 281a with the center line of the main spindle 203. The gang tool post 211 is moved to align the rear work tool 283a with the center line of the rear spindle 207. Then, the headstock 201 and the rear headstock 205 are moved in the Z-axial direction and $Z_1$-axial direction to bore a hole in the front face of the workpiece 210, held by the main spindle 203, with the front work tool 281a while boring a hole in the back face of the workpiece 210a, held by the rear spindle 207, with the rear work tool 283a.

The same is true of the simultaneous machining of the front face of one workpiece and the back face of another workpiece with the front work tool 281b and the rear work tool 283b and the simultaneous machining of the front face of one workpiece and the back face of another workpiece with the front work tool 281c and the rear work tool 283c. In those two cases, the movements of the rear headstock 205 and the gang tool post 211 are controlled to properly position the work tools.

This embodiment has the following advantages. Since the rear work tools 283a, 283b and 283c are mounted to the gang tool post 211 which can move independently, the rear work tools 283a, 283b and 283c can be properly positioned by controlling the movement of the gang tool post 211. The front work tools 281a, 281b and 281c can properly be positioned by controlling the movement of the rear headstock 205. Unlike in the prior art, therefore, the front work tools 281a, 281b and 281c and the rear work tools 283a, 283b and 283c can properly be positioned to simultaneously machine the front face of one workpiece and the back face of another workpiece, without requiring a separate positioning mechanism or high level of parts and assembly accuracy.

Figure 18:
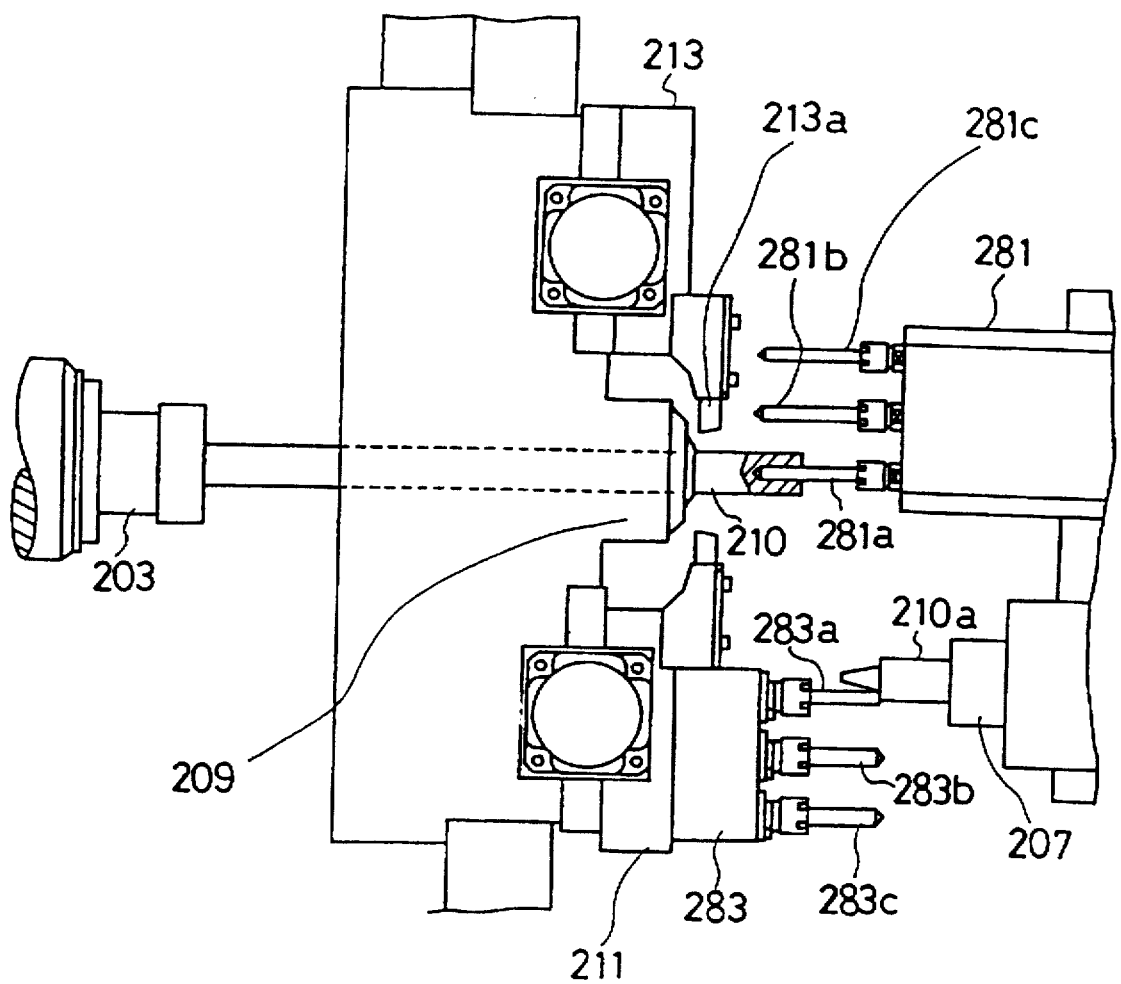
FIG. 18 is a plan view also showing the structure of the pair of gang tool posts and parts in vicinity thereof according to the fifth embodiment.
Figure 19:
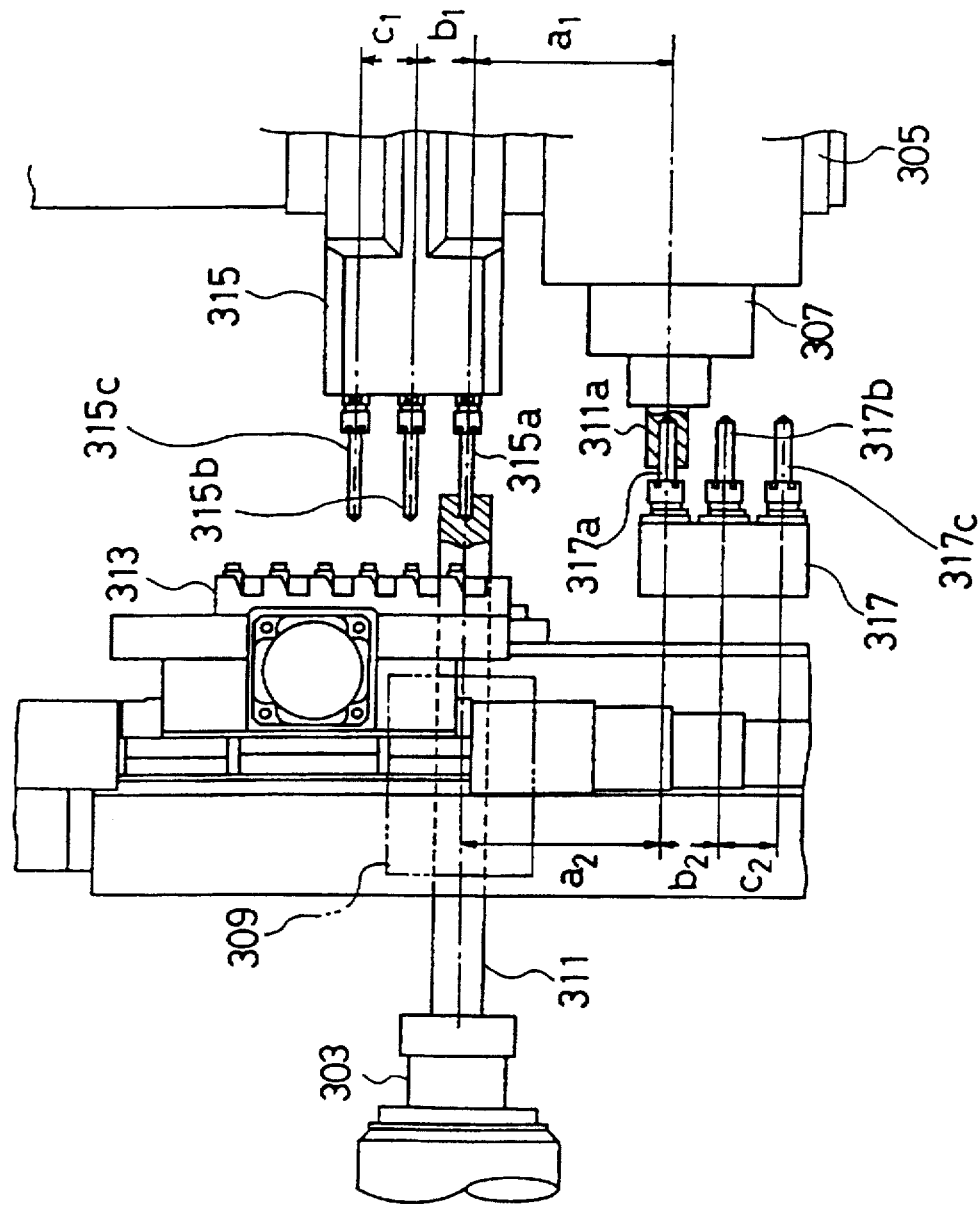
FIG. 19 is a plan view showing the structure of a pair of gang tool posts and parts in vicinity thereof according to prior art, for comparison with the fifth embodiment of this invention.

Another machining example will be described with reference to FIG. 18. In this case, the rear work tool 283a is a cutting tool. The front work tool 281a is used to bore a hole in the workpiece 210, held by the main spindle 203. At the same time, the rear headstock 205 is moved in the $Z_1$-axial direction and the gang tool post 211 is moved in the X-axial direction, so that the workpiece 210a held by the rear spindle 207 is tapered as shown in FIG. 18. This machining is also one example of the simultaneous machining of the front and back faces of respective workpieces, and it becomes possible by attaching the rear work tools 283a to 283c, which are secured to the lathe body in the prior art, to the gang tool post 211 whose movement is controlled independently.

Although this embodiment is premised on that the automatic lathe has a pair of gang tool posts 211 and 213 whose movements are controlled independently, with the rear work tools attached to one gang tool post 211, the rear work tools may be attached to the other gang tool post 213.

We claim:

1. An automatic lathe comprising:
   a pair of gang tool posts disposed on opposite sides with a headstock in between, said headstock having a main spindle and being moveable in an axial direction of said main spindle,
   movement of one of said pair of gang tool posts being controlled in an X-axis direction and a Y-axis direction both perpendicular to said axial direction of said main spindle and perpendicular to each other in order to perform tool selection and machining, and
   movement of the other of said pair of gang tool posts being controlled in an X'-axis direction and a Y'-axis direction both perpendicular to said axial direction of said main spindle and perpendicular to each other to perform tool selection and machining independently of said control of movement of said one of said pair of gang tool posts.

2. An automatic lathe as claimed in claim 1, wherein said one of said pair of gang tool posts is movable in said X-axis direction and said Y-axis direction by a mechanism including ball nuts and ball screws, and said other of said pair of gang tool posts is movable independently of said one of said pair of gang tool posts in said X'-axis direction and said Y'-axis direction by said mechanism including ball nuts and ball screws.

3. An automatic lathe as claimed in claim 2, further comprising means for independently driving and controlling each of said pair of gang tool posts.

4. An automatic lathe as claimed in claim 2, further comprising means for independently moving said pair of gang tool posts in first and second directions perpendicular to each other, such that movement by a first gang tool post of said pair of gang tool posts in one of said first and second directions does not require movement by a second gang tool post of said pair of gang tool posts in said one of said first and second directions.

5. An automatic lathe as claimed in claim 2, wherein said automatic lathe is for machining a workpiece with selected tools of said pair of gang tool posts, further comprising means for independently positioning tools of one of said pair of gang tools posts with respect to tools of the other of said pair of gang tool posts, wherein, while said workpiece is being machined by selected tools of said one of said pair of gang tool posts, tools of the other of said pair of gang tool posts are positioned, so as to one of simultaneously machine said workpiece and position the other of said pair of gang tool posts at a ready position for a next machining.

6. An automatic lathe as claimed in claim 1, further comprising means for independently driving and controlling each of said pair of gang tool posts.

7. An automatic lathe as claimed in claim 1, further comprising means for independently moving said pair of gang tool posts in first and second directions perpendicular to each other, such that movement by a first gang tool post of said pair of gang tool posts in one of said first and second directions does not require movement by a second gang tool post of said pair of gang tool posts in said one of said first and second directions.

8. An automatic lathe as claimed in claim 1, wherein said automatic lathe is for machining a workpiece with selected tools of said pair of gang tool posts, further comprising means for independently positioning tools of one of said pair of gang tools posts with respect to tools of the other of said pair of gang tool posts, wherein, while said workpiece is being machined by selected tools of said one of said pair of gang tool posts, tools of the other of said pair of gang tool posts are positioned, so as to one of simultaneously machine said workpiece and position the other of said pair of gang tool posts at a ready position for a next machining.

9. An automatic lathe comprising:

a pair of gang tool posts disposed on opposite sides with a headstock in between, said headstock having a main spindle and being moveable in an axial direction of said main spindle, one of said pair of gang tool posts being moveable in an X-axis direction and a Y-axis direction both perpendicular to said axial direction of said main spindle and perpendicular to each other, the other of said pair of gang tool posts being moveable in an X'-axis direction and a Y'-axis direction both perpendicular to said axial direction of said main spindle and perpendicular to each other, wherein front work tools are mounted on a rear headstock opposing to said headstock, said rear headstock having a rear spindle and being moveable in a direction parallel to said axial direction of said main spindle and also in a direction perpendicular to said direction, and rear work tools are mounted on one of said pair of gang tool posts.

10. An automatic lathe as claimed in claim 9, wherein said front work tools are movable in said axial direction of said main spindle independently of said rear headstock.

11. An automatic lathe comprising:

a pair of gang tool posts disposed on opposite sides with a headstock in between, said headstock having a main spindle and being movable in an axial direction of said main spindle, one of said pair of gang tool posts being movable in an X-axis direction and a Y-axis direction both perpendicular to said axial direction of said main spindle and perpendicular to each other, the other of said pair of gang tool posts being independently movable of said one of said pair of gang tool posts in an X'-axis direction and a Y'-axis direction both perpendicular to said axial direction of said main spindle and perpendicular to each other, said automatic lathe further comprising a front post opposing said gang tool posts, wherein said front post includes means for holding a workpiece and first rotary tools, said gang tool posts including second rotary tools and cutting tools positioned such that said lathe performs a cutting operation to form a plurality of workpieces from said workpiece and said first rotary tools and said second rotary tools simultaneously machine said workpieces.

12. An automatic lathe as claimed in claim 11, wherein said first rotary tools and said second rotary tools simultaneously perform different machining operations on said workpieces.

13. An automatic lathe as claimed in claim 11, wherein each one of said pair of gang tool posts comprises work tools separated by predetermined pitches, wherein pitches between said work tools mounted on one of said gang tool posts differ from pitches between said work tools mounted on the other gang tool post in such a way that when a free-end position of an arbitrary work tool of one of said gang tool posts is aligned with that of an arbitrary work tool of the other gang tool post, free-end positions of the other work tools of said one gang tool post mutually differ from free-end positions of the other work tools of said other gang tool post.

14. An automatic lathe comprising:

a stationary base;

a headstock connected to said base for supporting a workpiece, said workpiece extending in a Z direction; said headstock having a main spindle and being moveable in an axial direction of said main spindle;

a first gang tool support positioned on said base adjacent said headstock, said first gang tool support being movable in an X direction and a Y direction in order to perform tool selection and machining, wherein said X direction and said Y direction are perpendicular to one another and perpendicular to said Z direction, a second gang tool support positioned on said base adjacent said headstock and opposing said first gang tool support such that said workpiece is between said first gang tool support and said second gang tool support, said second gang tool support being movable in an X' direction and a Y' direction in order to perform tool selection and machining independently of said first gang tool support, wherein said X' direction and said Y' direction are perpendicular to one another, perpendicular to said Z direction and independent of said X direction and said Y direction.

15. An automatic lathe as in claim 14, further comprising a control unit for independently driving and controlling each of said first tool support and said second tool support.

16. An automatic lathe as in claim 14, further comprising a control unit for independently moving said first tool support and said second tool support, such that movement in said X direction and said Y direction by said first tool support does not move said second tool support and movement in said X' direction and said Y' direction by said second tool support does not move said first tool support.

17. An automatic lathe as in claim 14, further comprising:

a first set of tools, mounted on said first tool support, for machining said workpiece;

a second set of tools, mounted on said second tool support, for machining said workpiece; and a control unit for independently positioning said first tool support and said second tool support wherein while said workpiece is being machined by said first set of tools, said second set of tools are positioned so as to one of simultaneously machine said workpiece and be at a ready position for a next machining.

* * * * *